(12) United States Patent
Jin et al.

(10) Patent No.: US 11,277,071 B2
(45) Date of Patent: Mar. 15, 2022

(54) CONTROLLER AND CONTROL METHOD USED IN RESONANT CONVERTERS

(71) Applicant: Chengdu Monolithic Power Systems Co., Ltd., Chengdu (CN)

(72) Inventors: Yiqing Jin, Hangzhou (CN); Siran Wang, Hangzhou (CN); Hantao Lin, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 71 days.

(21) Appl. No.: 17/029,533

(22) Filed: Sep. 23, 2020

(65) Prior Publication Data

US 2021/0111620 A1    Apr. 15, 2021

(30) Foreign Application Priority Data

Oct. 14, 2019   (CN) .......................... 201910971867.4

(51) Int. Cl.
*H02M 3/335*   (2006.01)
*H02M 1/08*   (2006.01)
*H02M 1/00*   (2006.01)

(52) U.S. Cl.
CPC ...... *H02M 3/33569* (2013.01); *H02M 1/0048* (2021.05); *H02M 1/08* (2013.01)

(58) Field of Classification Search
CPC .. H02M 1/08; H02M 3/33569; H02M 1/0048; H02M 1/44; H02M 1/0025; H02M 1/0035; H02M 3/01; H02M 3/33571; H02M 3/33523; Y02B 70/10; H01F 27/24; H01F 27/28

See application file for complete search history.

(56) References Cited

U.S. PATENT DOCUMENTS

| | | | |
|---|---|---|---|
| 9,525,358 B2 | 12/2016 | Jin et al. | |
| 9,912,244 B2 | 3/2018 | Chen | |
| 10,715,048 B2 | 7/2020 | Miao | |
| 2017/0093296 A1* | 3/2017 | Chen | H02M 3/3376 |
| 2017/0187298 A1* | 6/2017 | Lin | H02M 3/33523 |
| 2020/0007043 A1* | 1/2020 | Miao | H02M 3/33523 |

* cited by examiner

*Primary Examiner* — Kyle J Moody
(74) *Attorney, Agent, or Firm* — Perkins Coie LLP

(57) ABSTRACT

A control circuit used in a resonant converter with a switching circuit and a resonant circuit is provided, the switching circuit has a high side transistor and a low side transistor, the resonant circuit has a resonant capacitor and a resonant inductor. The control circuit includes: a calculating module used to generate an output current calculating value based on a voltage across the resonant capacitor and a correction signal at an off moment of the high side transistor; a comparing module used to compare the output current calculating value with a burst mode threshold value and generate a burst mode control signal by comparing the output current calculating value with the burst mode threshold value; and a switching control module used to control the resonant converter to work in a burst mode or a normal mode based on the burst mode control signal.

18 Claims, 8 Drawing Sheets

CONTROLLER AND CONTROL METHOD USED IN RESONANT CONVERTERS

CROSS-REFERENCE TO RELATED APPLICATIONS

This application claims the benefit of CN application 201910971867.4, filed on Oct. 14, 2019, and incorporated herein by reference.

TECHNICAL FIELD

The present invention generally relates to electronic circuits, and more particularly but not exclusively, to resonant converters.

BACKGROUND

In resonant converters, a switching circuit converts a DC voltage into a square wave voltage and provides it to a resonant circuit. When at light load, the resonant converter is required to change working modes (e.g. controlling the resonant converter working in a burst mode, i.e. controlling the switching circuit to be driven by high-frequency pulses in a first period and to keep off in a second period adjacent to the first period) to improve the efficiency and reduce the switching loss. Therefore, the equivalent switching frequency is reduced and the efficiency at light load is improved.

However, when judging whether the resonant converter enters into the burst mode or not based on an output feedback signal indicative of the output voltage of the resonant converter, due to the variation of circuit parameters, the corresponding load current is uncertain when entering into the burst mode, and this will further bring audio noise and other problems.

SUMMARY

Embodiments of the present invention are directed to a controller used in a resonant converter with a switching circuit and a resonant circuit, wherein the switching circuit has a high side transistor coupled between an input voltage and a switch node and a low side transistor coupled between the switch node and a reference ground, the resonant circuit is coupled to the switch node and has a resonant capacitor and a resonant inductor, the controller comprises: a calculating module, configured to generate an output current calculating value based on a voltage across the resonant capacitor at an off moment of the high side transistor and a correction signal; a comparing module, configured to compare the output current calculating value with a burst mode threshold value, and configured to generate a burst mode control signal based on a comparing result of the output current calculating value and the burst mode threshold value; and a switching control module, configured to receive the burst mode control signal and control the resonant converter to work in a burst mode or a normal mode based on the burst mode control signal; wherein when the resonant converter works in the burst mode, the switching control module is configured to control the high side transistor and the low side transistor to be driven by alternate pulses in a first period, and configured to control the high side transistor and the low side transistor keeping off in a second period adjacent to the first period; and when the resonant converter works in the normal mode, the switching control mode is configured to control the high side transistor and the low side transistor to be driven by the alternate pulses.

Embodiments of the present invention are also directed to a resonant converter, comprising: a switching circuit having a high side transistor and a low side transistor, wherein the high side transistor is coupled between an input voltage and a switch node, and the low side transistor is coupled between the switch node and a reference ground; a resonant circuit coupled to the switch node, wherein the resonant circuit has a resonant capacitor and a resonant inductor; a voltage sensing circuit, configured to sense a voltage across the resonant capacitor and generate a voltage sensing signal; a calculating module, configured to generate an output current calculating value based on the voltage sensing signal at an off moment of the high side transistor and a correction signal; a calculating module, configured to generate an output current calculating value based on a voltage across the resonant capacitor at an off moment of the high side transistor and a correction signal; a comparing module, configured to compare the output current calculating value with a burst mode threshold value, and configured to generate a burst mode control signal based on a comparing result of the output current calculating value and the burst mode threshold value; and a switching control module, configured to receive the burst mode control signal and control the resonant converter to work in a burst mode or a normal mode based on the burst mode control signal; wherein when the resonant converter works in the burst mode, the switching control module is configured to control the high side transistor and the low side transistor to be driven by alternate pulses in a first period, and configured to control both the high side transistor and the low side transistor keeping off in a second period adjacent to the first period; and when the resonant converter works in the normal mode, the switching control mode is configured to control the high side transistor and the low side transistor to be driven by the alternate pulses.

Embodiments of the present invention are further directed to a control method used in a resonant converter with a switching circuit and a resonant circuit, wherein the switching circuit has a high side transistor coupled between an input voltage and a switch node and a low side transistor coupled between the switch node and a reference ground, the resonant circuit is coupled to the switch node and has a resonant capacitor and a resonant inductor, the control method comprises: sensing an output feedback signal indicative of an output voltage of the resonant converter or sensing a feedback compensation signal, wherein the feedback compensation signal is equal to a difference between the output feedback signal and a bias voltage; generating an output current calculating value based on the output feedback signal or the feedback compensation signal; and controlling the resonant converter to work in a normal mode or a burst mode based on the output current calculating value; wherein when the resonant converter works in the burst mode, the high side transistor and the low side transistor are configured to be driven by alternate pulses in a first period, and the high side transistor and the low side transistor are configured to keep off in a second period adjacent to the first period; and when the resonant converter works in the normal mode, the high side transistor and the low side transistor are configured to be driven by the alternate pulses.

According to the embodiments of the present invention, the output current calculating value generated based on the output feedback signal and the correction signal is compared with the burst mode threshold value to decide when to enter into the burst mode, therefore, the influence of the variation of the circuit parameters on entering into the burst mode is reduced and the audio noise is eliminated.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
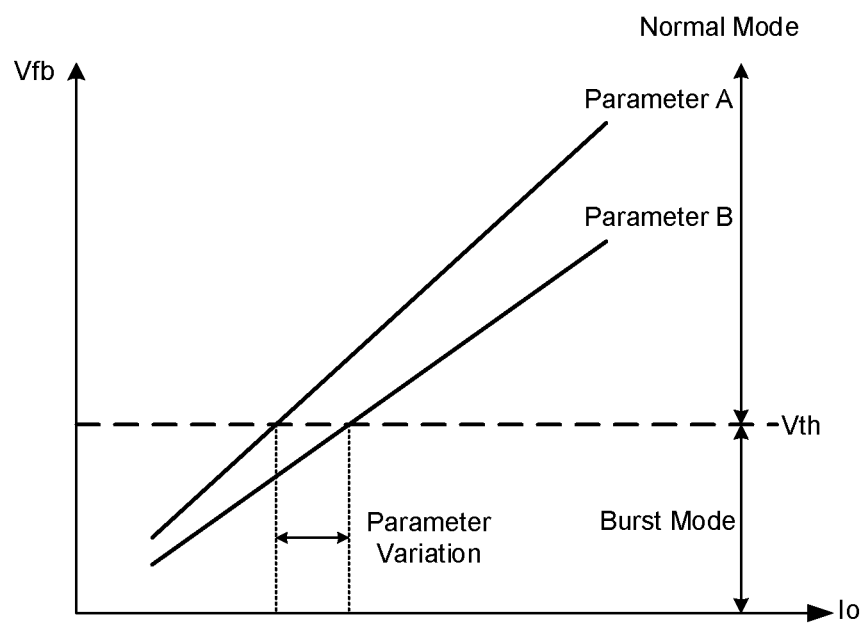
FIG. 1 schematically illustrates different modes a resonant converter works based on an output feedback signal indicative of an output voltage of the resonant converter.

FIG. 1 schematically illustrates different modes a resonant converter works based on an output feedback signal Vfb indicative of the output voltage of the resonant converter. As shown in FIG. 1, when the output feedback signal Vfb indicative of the output voltage of the resonant converter is less than a threshold value Vth, the resonant converter enters into the burst mode, and when the output feedback signal Vfb is greater than the threshold value Vth, the resonant converter exits out of burst mode. During when the resonant converter enters into or exits out of burst mode based on the output feedback signal Vfb, due to a variation of switching frequency, inductance value and capacitance value (e.g. the switching frequency varies from parameter A to parameter B), the output feedback signal Vfb may not correspond with the actual load current Io. Therefore, when the resonant converter enters into the burst mode based directly on the output feedback signal Vfb, this entry into the burst mode may be erroneous.

Figure 2:
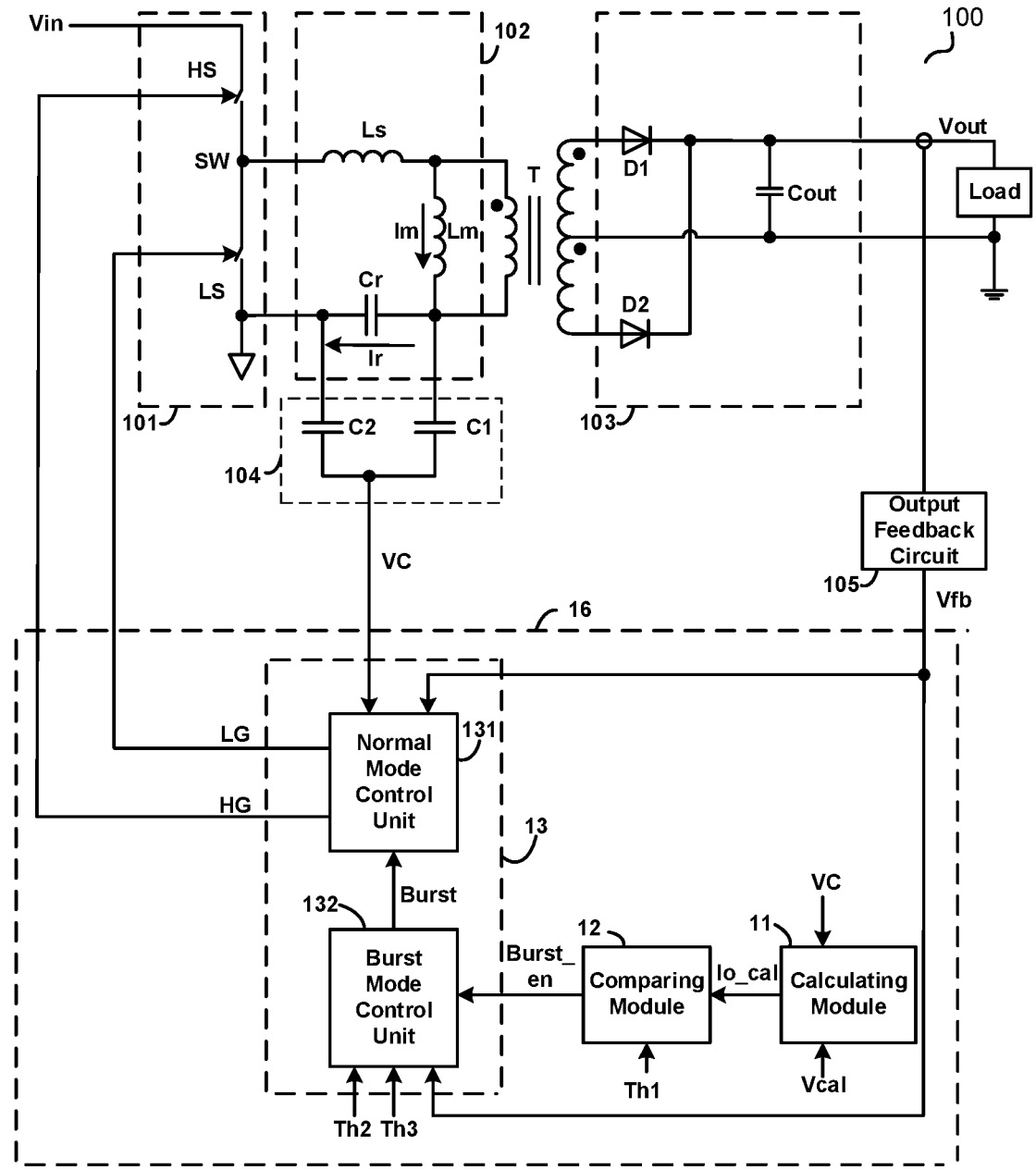
FIG. 2 is a block diagram of a resonant converter 100 in accordance with an embodiment of the present invention.

FIG. 2 is a block diagram of a resonant converter 100 in accordance with an embodiment of the present invention. It comprises a switching circuit 101, a resonant circuit 102, a transformer T, a rectifying and filtering circuit 103, a voltage sensing circuit 104, an output feedback circuit 105, and a control circuit 16. The switching circuit 101 includes a high side transistor HS coupled between an input voltage Vin and a switch node SW and a low side transistor LS coupled between the switch node SW and a reference ground. The resonant circuit 102 is coupled to the switch node SW, and includes an LLC circuit consisting of a capacitor Cr and inductors Ls, Lm. The inductor Lm is generally formed by a magnetizing inductance of the transformer T. However, a discrete inductor may also be used. The rectifying and filtering circuit 103 is coupled between the secondary winding of the transformer T and a load, and configured to provide an output voltage Vout to the load by rectifying and filtering a voltage across the secondary winding of the transformer The primary winding of the transformer T is coupled to the resonant circuit 102. The rectifying and filtering circuit 103, which includes diodes D1, D2 and a capacitor Cout, rectifies and filters the voltage across the secondary winding of the transformer T, so as to provide the output voltage Vout to the load. Although the rectifying and filtering circuit 103 employs a full-wave rectifying circuit consisting of diodes D1 and D2 and a filter circuit consisting of the capacitor Cout in the embodiment shown in FIG. 2, those skilled in the art can understand that, rectifying circuits and filter circuits with other structures (e.g. half-wave rectification, full-bridge rectification) are also applicable here.

The voltage sensing circuit 104 is configured to sense a voltage Vcr across the resonant capacitor Cr and generate a voltage sensing signal VC. The voltage sensing circuit 104 of FIG. 2 includes capacitors C1, C2 and a resistor R1. The capacitor C1 has a first terminal and a second terminal, wherein the first terminal is coupled to the resonant capacitor Cr, and the second terminal is configured to provide the voltage sensing signal VC. The resistor R1 and capacitor C2 are coupled in parallel between the second terminal of capacitor C1 and the reference ground. In the embodiment shown in FIG. 2, the capacitor C1 works as a DC blocking capacitor, which isolates DC signal and allows only AC signal to pass. Therefore, the voltage sensing signal VC no longer includes DC component, but substantially has an AC quasi-sinusoidal waveform.

The output feedback circuit 105 is configured to generate an output feedback signal Vfb based on the output voltage Vout. In some embodiments, the output feedback circuit 105 includes a voltage divider coupled to the output voltage Vout, and an error amplifying circuit which proportionally integrates the error between the signal generated by the voltage divider and a reference voltage. In some other embodiments of the present invention, the output feedback circuit 105 utilizes a conventional three-terminal regulator and an impedance network to obtain the output feedback signal Vfb. In applications where the primary and secondary windings of the transformer are electrically isolated from each other, the output feedback circuit 105 may further include isolation devices, such as photo couplers.

The control circuit 16 is coupled to the voltage sensing circuit 104 and the output feedback circuit 105. According to the output feedback signal Vfb and the voltage sensing signal VC, the control circuit 16 is configured to generate a high side control signal HG to control the high side transistor HS and a low side control signal LG to control the low side transistor LS. Wherein the control circuit 16 comprises a calculating module 11, a comparing module 12 and a switching control module 13.

The calculating module 11 is configured to generate an output current calculating value Io_cal based on the voltage sensing signal VC and a correction signal Vcal. In one embodiment of the present invention, the correction signal Vcal is proportional to a switching frequency fs of the switching circuit 101. In another embodiment of the present invention, the correction signal Vcal is further proportional to the input voltage Vin. E.g. the correction Vcal is indicative of the switching frequency fs or a product fs×Vin of the switching frequency fs and the input voltage Vin.

In an embodiment of the present invention, the calculating module 11 is configured to generate the output current calculating value Io_cal according to equation (1), wherein K is indicative of a constant value, Voffset is indicative of a bias voltage (e.g. set the bias voltage Voffset to 0.5V).

$$Io\_cal = K \times Cr \times (Vfb - Voffset) \times Vcal \quad (1)$$

In an embodiment of the present invention, at an off moment of the high side transistor HS, the voltage Vcr across the resonant capacitor Cr is equal to a difference Vfb−Voffset between the output feedback signal Vfb and the bias voltage Voffset, and the calculating module 11 can generate the output current calculating value Io_cal based on a product Vcr×Vcal of the voltage Vcr across the capacitor Cr and the correction signal Vcal, e.g. generate the output current calculating value Io_cal according to equation (2), wherein VC1 is indicative of a voltage sensing signal at the off moment of the high side transistor HS, Vdelay is indicative of a sampling error due to sampling delay or other reasons.

$$Io\_cal = K \times Cr \times Vcr \times Vcal = K \times Cr \times (VC1 - Vdelay) \times Vcal \quad (2)$$

The comparing module 12 is configured to generate a burst mode control signal Burst_en by comparing the output current calculating value Io_cal with a burst mode threshold value Th1. In one embodiment, when the output current calculating value Io_cal is less than the burst mode threshold value Th1, the burst mode control signal Burst_en indicates to control the resonant converter 100 working in the burst mode, and when the output current calculating value Io_cal is greater than the burst mode threshold value Th1, the burst mode control signal Burst_en indicates to control the resonant converter 100 working in the normal mode.

The switching control module 13 is configured to generate the high side control signal HG and the low side control signal LG based on the burst mode control signal Burst_en, the output feedback signal Vfb and the voltage sensing signal VC. The switching control module 13 controls the resonant converter 100 to work in the burst mode or the normal mode based on the burst mode control signal Burst_en. When the resonant converter 100 works in the burst mode, the switching control module 13 is configured to control both the high side transistor HS and the low side transistor LS to be driven by alternate pulses in a first period, and control both the high side transistor HS and the low side transistor LS to keep off in a second period adjacent to the first period. When the resonant converter 100 works in the normal mode, the switching control module 13 is configured to control the high side transistor HS and the low side transistor LS to be driven by the alternate pulses. In the embodiment shown in FIG. 2, the switching control module 13 comprises a normal mode control unit 131 and a burst mode control unit 132. Wherein the burst mode control unit 132 is configured to receive the burst mode control signal Burst_en and the output feedback signal Vfb, and is configured to provide a mode indication signal Burst. In one embodiment, when the burst mode control signal Burst_en indicates to control the resonant converter 100 working in the burst mode, the burst mode control unit 132 is configured to provide the mode indication signal Burst by comparing the output feedback signal Vfb with a threshold value Th2 and a threshold value Th3. The normal mode control unit 131 is configured to receive the mode indication signal Burst, the output feedback signal Vfb and the voltage sensing signal VC, and configured to generate the high side control signal HG and the low side control signal LG based on the mode indication signal Burst, the output feedback signal Vfb and the voltage sensing signal VC.

In the embodiment shown in FIG. 2, without the need to directly sense the output current Io, the output current calculating value Io_cal generated based on the voltage sensing signal VC and the correction signal Vcal can be compared with the burst mode threshold value Th1 to decide when to enter into the burst mode, so as to control a load current when the resonant converter 100 enters into the burst mode keeping constant, therefore the influence due to the variation of circuit parameters can be reduced.

Figure 3:
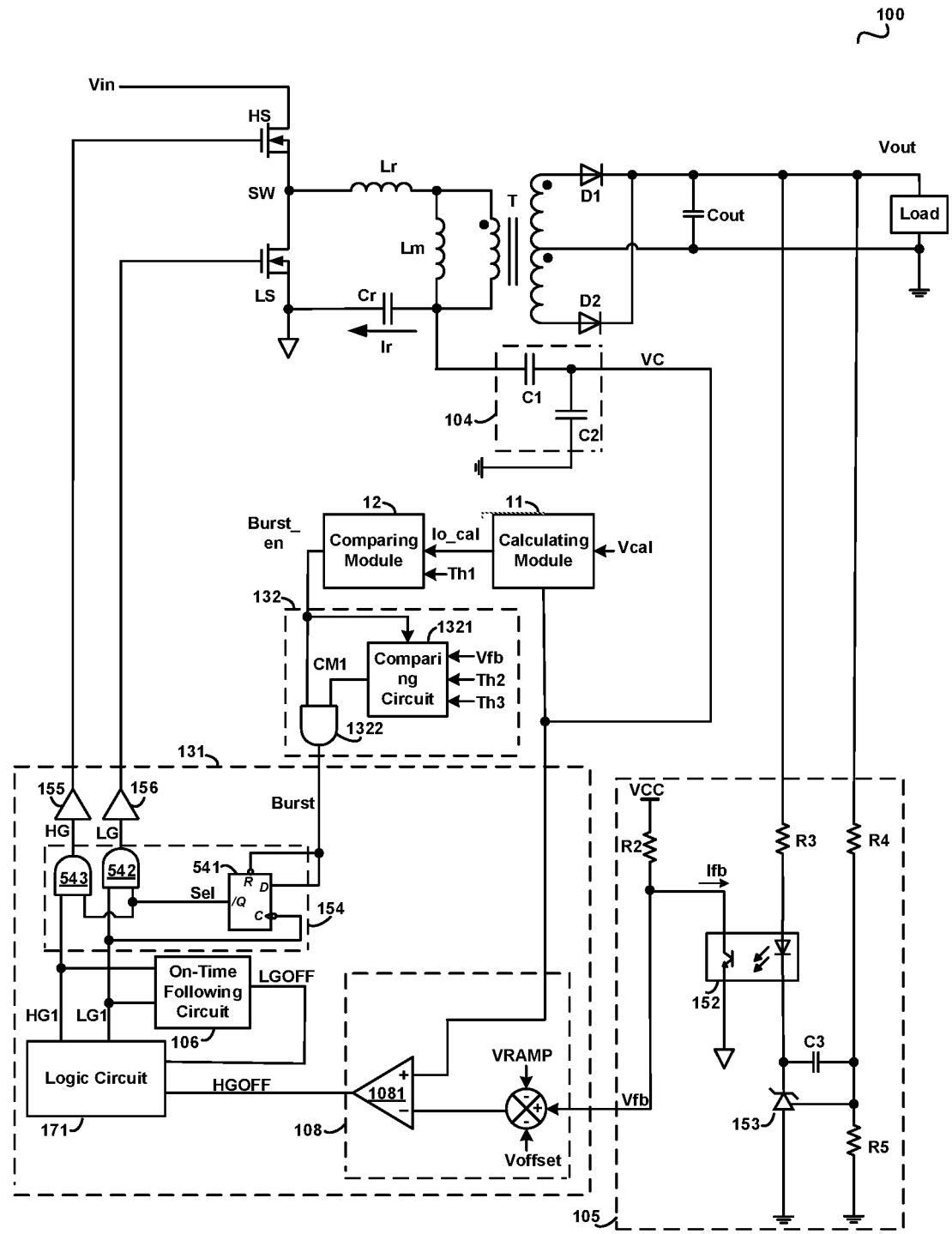
FIG. 3 schematically illustrates a circuit diagram of the resonant converter 100 in accordance with an embodiment of the present invention.

FIG. 3 schematically illustrates a circuit diagram of the resonant converter 100 in accordance with an embodiment of the present invention. In the embodiment shown in FIG. 3, the output feedback circuit 105 comprises a photo coupler 152, a three terminal regulator 153, resistors R2-R5 and a capacitor C3, and the output feedback circuit 105 is configured to produce a current Ifb of a light sensor in the photo coupler 152. The current Ifb is configured to be translated to the output feedback signal Vfb.

In the embodiment shown in FIG. 3, the burst mode control unit 132 comprises a first comparing circuit 1321 and an and gate circuit 1322. When the burst mode control signal Burst_en indicates to control the resonant converter 100 to work in the burst mode, the first comparing circuit 1321 is configured to compare the output feedback signal Vfb with the threshold value Th2 and the threshold value Th3 respectively, and configured to generate a comparing signal CM1 based on the comparing results. A first input terminal of the and gate circuit 1322 is configured to receive the burst mode control signal Burst_en, a second input terminal of the and gate circuit 1322 is configured to receive the comparing signal CM1, and an output terminal of the and gate circuit 1322 is configured to generate the mode indication signal Burst based on a comparing result of the burst mode control signal Burst_en and the comparing signal CM1. When the mode indication signal Burst is in a first condition, e.g. low level, the high side transistor HS and the low side transistor LS are configured to be driven by the alternate pulses; when the mode indication signal Burst is in a second condition, e.g. high level, the high side transistor HS and the low side transistor LS are configured to be off.

In the embodiment shown in FIG. 3, the normal mode control unit 131 comprises a second comparing circuit 108, a logic circuit 171, an on-time following circuit 106, a mode control circuit 154, a driving circuit 155 and a driving circuit 156. The second comparing circuit 108 is coupled to the voltage sensing circuit 104 and the output feedback circuit 105, and is configured to generate a high side off signal HGOFF by comparing the voltage sensing signal VC with the output feedback signal Vfb. In some embodiments, in order to keep the resonant converter working steadily, a slope compensation signal VRAMP is added to the voltage sensing signal VC or subtracted from the output feedback signal Vfb. In some embodiments, in order to offset the influence of the saturation voltage of the light sensor in the photo coupler 152, the bias voltage Voffset is added to the voltage sensing signal VC or subtracted from the output feedback signal Vfb. In the embodiment shown in FIG. 3, the second comparing circuit 108 comprises a comparator 1081, a non-inverting input terminal of the comparator 1081 is configured to receive the voltage sensing signal VC, an inverting input terminal of the comparator 1081 is configured to receive a signal by subtracting the slope compensation signal VRAMP and the bias voltage Voffset from the output feedback signal Vfb, e.g. Vfb−VRAMP−Voffset, and an output terminal of the comparator 1081 is configured to generate the high side off signal HGOFF.

Based on the high side off signal HGOFF, the resonant converter 100 can respectively control a high side control signal HG1 of the high side transistor HS and a low side control signal LG1 of the low side transistor LS through the on-time following circuit 106 and the logic circuit 107. In ideal conditions, when the mode indication signal Burst is in the first condition, the high side transistor HS and the low side transistor LS are turned on complementary alternately. The high side off signal HGOFF decides when the high side transistor HS be turned off and when the low side transistor LS be turned on. When the mode indication signal Burst is in the first condition, the resonant converter 100 is configured to detect an on-time of the high side transistor HS, and when the on-time of the low side transistor HS reaches the detected on-time of the high side transistor HS, the low side transistor LS is turned on and the high side transistor HS is turned off. The on-time following circuit 106 receives the high side control signal HG1 and the low side control signal LG1, detects the on-time of the high side transistor HS based on the high side control signal HG1, and generates a low side off signal LGOFF based the low side control signal LG1 and the detected on-time of high side transistor HS. The logic circuit 107 is coupled to the second comparing circuit 108 and the on-time following circuit 106, and generates the high side control signal HG1 and low side control signal LG1 based on the high side off signal HGOFF and the low side off signal LGOFF. The mode control circuit 154 is configured to generate the high side control signal HG and the low side control signal LG based on the high side control signal HG1, the low side control LG1 and the mode indication signal Burst. When the mode indication signal Burst is in the first condition, the mode control circuit 154 provides a low level high side control signal HG to control the high side transistor HS keeping off, and provides a low level low side control signal LG to control the low side transistor LS keeping off. In one embodiment, the mode control circuit 154 comprises a D trigger 541, an and gate 542 and an and gate 543. A data input terminal D of the D trigger 541 is configured to receive the mode indication signal Burst, a clock input terminal Clk of the D trigger 541 is configured to receive the low side control signal LG1, a reset terminal R of the D trigger 541 is configured to receive the mode indication signal Burst, and an output terminal /Q of the D trigger 541 is configured to output a selection signal Sel. In one embodiment of the present invention, the clock input terminal Clk of the D trigger 541 is efficient at the falling edge of the low side control signal LG1, and the reset terminal R of the D trigger 541 is efficient at the low level.

An input terminal of the and gate 542 is coupled to the output terminal of the D trigger 541 to receive the selection signal Sel, another input terminal of the and gate 542 is coupled to the logic circuit 171 to receive the low side control signal LG1, and an output terminal of the and gate 542 is configured to output the low side control signal LG. An input terminal of the and gate 543 is coupled to the output terminal of the and gate 542 to receive the selection signal Sel, another input terminal of the and gate 543 is coupled to the logic circuit 171 to receive the high side control signal HG1, and an output terminal of the and gate 543 is configured to output the high side control signal HG.

In the embodiment shown in FIG. 3, both the high side transistor HS and the low side transistor LS are NMOS transistors, the high side control signal HG is coupled to the gate of the high side transistor HS via the driving circuit 155, and the low side control signal LG is coupled to the gate of the low side transistor LS via the driving circuit 156.

Although the switching circuit is configured in half bridge circuit in all embodiments described above, persons of ordinary skill in the art could recognize that, the switching circuit can also be configured in a full bridge circuit with four transistors. Furthermore, transistors in the switching circuit could be other controllable semiconductor transistors besides MOSFET. Similarly, although an LLC circuit is used as an example of the resonant circuit in the foregoing embodiments, other resonant circuits, such as LCC circuit, are also applicable to the present invention.

Figure 4:
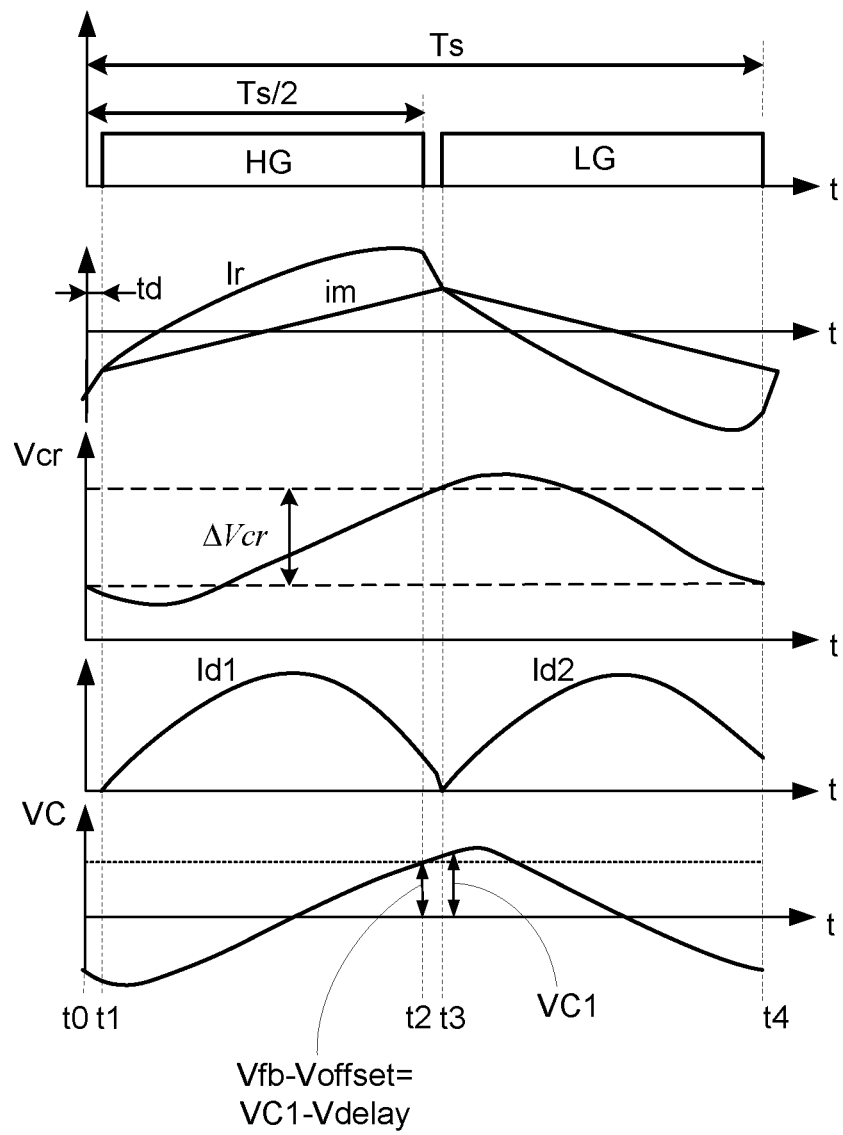
FIG. 4 illustrates working waveforms of the resonant converter 100 in accordance with an embodiment of the present invention.

FIG. 4 illustrates working waveforms of the resonant converter 100 in accordance with an embodiment of the present invention. Wherein Ir is indicative of a current flowing through the capacitor Cr, Im is indicative of a current flowing through the inductor Lm, Vcr is indicative of the voltage across the resonant capacitor Cr, Id1 is indicative of a current flowing through the diode D1, and Id2 is indicative of a current flowing through the diode D2. Time t0 to t4 constitutes a switching period Ts of the switching circuit 101. At the moment t0, as the beginning of the switching period Ts, both the high side control signal HG and the low side switching signal LG keep at low level. At time t1-t2, the high side control signal HG is at high level, the high side transistor is turned on, the low side control signal LG is at low level, and the low side transistor LS is off. At the moment t2, the high side control signal HG turns to low level, the high side transistor HS is turned off, in an ideal condition, at this moment, the voltage sensing signal VC is equal to the difference Vfb−Voffset between the output feedback signal Vfb and the bias voltage Voffset. But due to circuit delay, the difference Vfb−Voffset is equal to a difference VC1−Vdelay between the voltage sensing signal VC1 and a delay voltage Vdelay. During the time t3-t4, the high side control signal HG is at low level, the high side transistor HS is off, the low side control signal LG is at high level, the low side transistor LS is on. In the ideal condition, the high side transistor HS and the low side transistor LS are turned on complementary alternately. In practical applications, in order to avoid pipe straight between the high side transistor HS and the low side transistor LS and in order to realize soft turning-on of the high side transistor HS and the low side transistor LS, an interval time can be set between the off-time of one of the transistors HS, LS and the on-time of another one of the transistors HS, LS, wherein the interval time is called "dead time". The dead time can be constant or can be adjusted self-adaptively based on an operation of the circuit. In the embodiment shown in FIG. 4, time td during the time t0-t1 and the time t2-t3 is the dead time.

Following equations (3)-(5) are obtained according to the waveforms shown in FIG. 4 and the block diagram shown in FIG. 2-3.

$$\frac{Io}{N} = \frac{2}{T_S} \times \int_{t1}^{t3} (Ir - Im)dt = \quad (3)$$

$$\frac{2}{T_S} \times \int_{t1}^{\frac{T_S}{2}+t1} (Ir - Im)dt = \int_0^{\frac{T_S}{2}} Irdt + \int_{\frac{T_S}{2}}^{\frac{T_S}{2}+t1} Irdt - \int_0^{t1} Irdt$$

$$\int_0^{\frac{T_S}{2}} Irdt = Cr \times \Delta Vcr \quad (4)$$

$$\Delta Vcr = 2(VC1 - Vdelay) \times (C1 + C2)/C1 \quad (5)$$

Wherein N is indicative of a turn ratio between the primary and secondary side of the transformer T, Ir is indicative of the current flowing through the capacitor Cr, Im is indicative of the current flowing through the inductor Lm, and ΔVcr is indicative of a voltage variation across the capacitor Cr.

When the dead time td is approach to zero, the following equation (6) can be obtained according to equations (3)-(5).

$$\frac{Io}{N} = 4Cr \times (Vfb - \times Voffset) \times f_s \times Cr(C1 + C2)/C1 \quad (6)$$

The above-mentioned equation (1) can be obtained according to the equation (6), wherein the correction signal Vcal is equal to the switching frequency fs.

In an embodiment, at the moment t2 as shown in FIG. 4, when the high side transistor HS is turned off, the high side control signal HG is configured to control the voltage sensing signal VC to be equal to the difference Vfb−Voffset. Therefore, the following equation (7) can be obtained according to the equation (6) at the off moment of the high side transistor HS.

$$\frac{Io}{N} = 4Cr \times (VC1 - \times Vdelay) \times f_s \times Cr(C1 + C2)/C1 \quad (7)$$

The above-mentioned equation (2) can be obtained according to the equation (8), wherein the correction signal Vcal is equal to the product of the switching frequency fs and the input voltage Vin.

At the off moment of the high side transistor HS, the voltage sensing signal VC is equal to the difference Vfb−Voffset, and the equation (9) can be obtained according to the equation (8).

$$Vo \times Io = Vin \times 4Cr \times (VC1 - Vdelay) \times fs \times Cr(C1+C2)/C1 \quad (9)$$

The above-mentioned equation (2) can be obtained according to the equation (9), wherein the correction signal Vcal is equal to a product of the switching frequency fs and the input voltage Vin.

Figure 5:
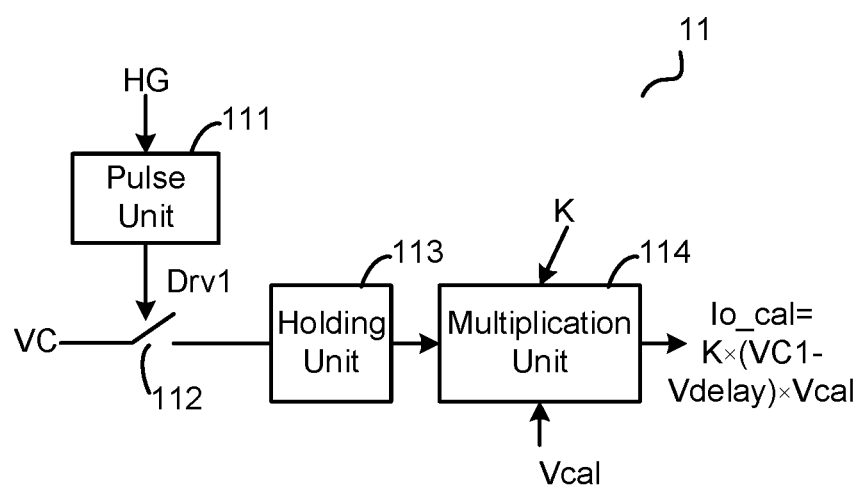
FIG. 5 schematically illustrates a calculating module 11 in the resonant converter 100 in accordance with an embodiment of the present invention.

FIG. 5 schematically illustrates a calculating module 11 in the resonant converter 100 in accordance with an embodiment of the present invention. In the embodiment shown in FIG. 5, the calculating module 11 comprises a pulse unit 111, a switch 112, a holding unit 113 and a multiplication unit 114. The pulse unit 111 is configured to generate a pulse signal Drv1 based on the high side control signal HG, wherein the pulse signal Drv1 is used to control the switch 112 keeping on for a first predetermined time at the off time of the high side transistor HS. A first terminal of the switch 112 is configured to receive the voltage sensing signal VC, and a control terminal of the switch 112 is coupled to the pulse unit 111 to receive the pulse signal Drv1. An input terminal of the holding unit 113 is coupled to a second terminal of the switch 112, an output terminal of the holding unit 113 is configured to output the voltage sensing signal VC at the off moment of the high side transistor HS. E.g. the holding unit 113 comprises a capacitor. The multiplication unit 114 is configured to receive a constant K, the voltage sensing signal VC at the off moment of the high side transistor HS and the correction signal Vcal, and the multiplication unit 114 is configured to generate the output current calculating value lo_cal based on the constant K, the voltage sensing signal VC at the off moment of the high side transistor HS and the correction signal Vcal.

Figure 6:
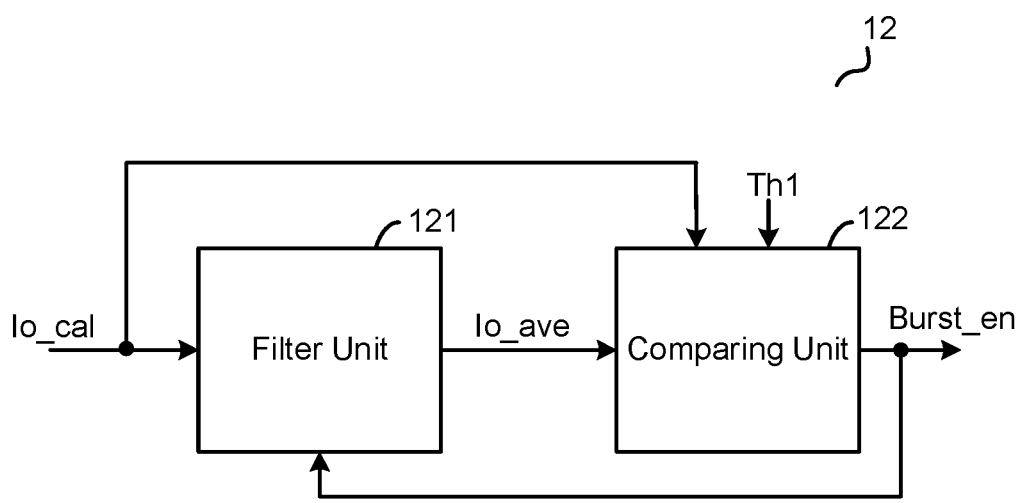
FIG. 6 schematically illustrates a comparing module 12 in the resonant converter 100 in accordance with an embodiment of the present invention.

FIG. 6 schematically illustrates a comparing module 12 in the resonant converter 100 in accordance with an embodiment of the present invention. In the embodiment shown in FIG. 6, the comparing module 12 comprises a filter unit 121 and a comparing unit 122. The filter unit 121 is configured to receive the output current calculating value lo_cal and output an average value lo_ave of the output current calculating value lo_cal by filtering the output current calculating value lo_cal. And the filter unit 121 is configured to receive the output current calculating value lo_cal and the average value lo_ave, and configured to generate a burst mode control signal Burst_en based on the output current calculating value lo_cal, the average value lo_ave and the burst mode threshold value Th1. In an embodiment of the present invention, the filter unit 121 is configured to further receive the burst mode control signal Burst_en and employ different filtering modes based on different modes of the resonant converter 100. E.g. when the burst mode control signal Burst_en indicates to control the resonant converter 100 working in the normal mode, the filter unit 121 averages the output current calculating value lo_cal in a second predetermined time set by users. Besides, e.g. when the burst mode control signal Burst_en indicates to control the resonant converter 100 working in the burst mode, the filter unit 121 averages the output current calculating value lo_cal in one or more burst periods Tburst.

In an embodiment of the present invention, when the resonant converter 100 works in the normal mode, if the output current calculating value lo_cal is less than the burst mode threshold value Th1, the comparing unit 122 judges whether to change the resonant converter 100 to the burst mode or not by comparing the average value lo_ave with the burst mode threshold value Th1. In an embodiment of the present invention, when the resonant converter 100 works in the burst mode, the comparing unit 122 judges whether to change the resonant converter 100 to normal mode or not by comparing the average value lo_ave with the burst mode threshold value Th1. When the average value lo_ave is greater than a sum Th1+Hys of the burst mode threshold value Th1 and a hysteresis signal Hys, the resonant converter 100 changes to the normal mode.

Figure 7:
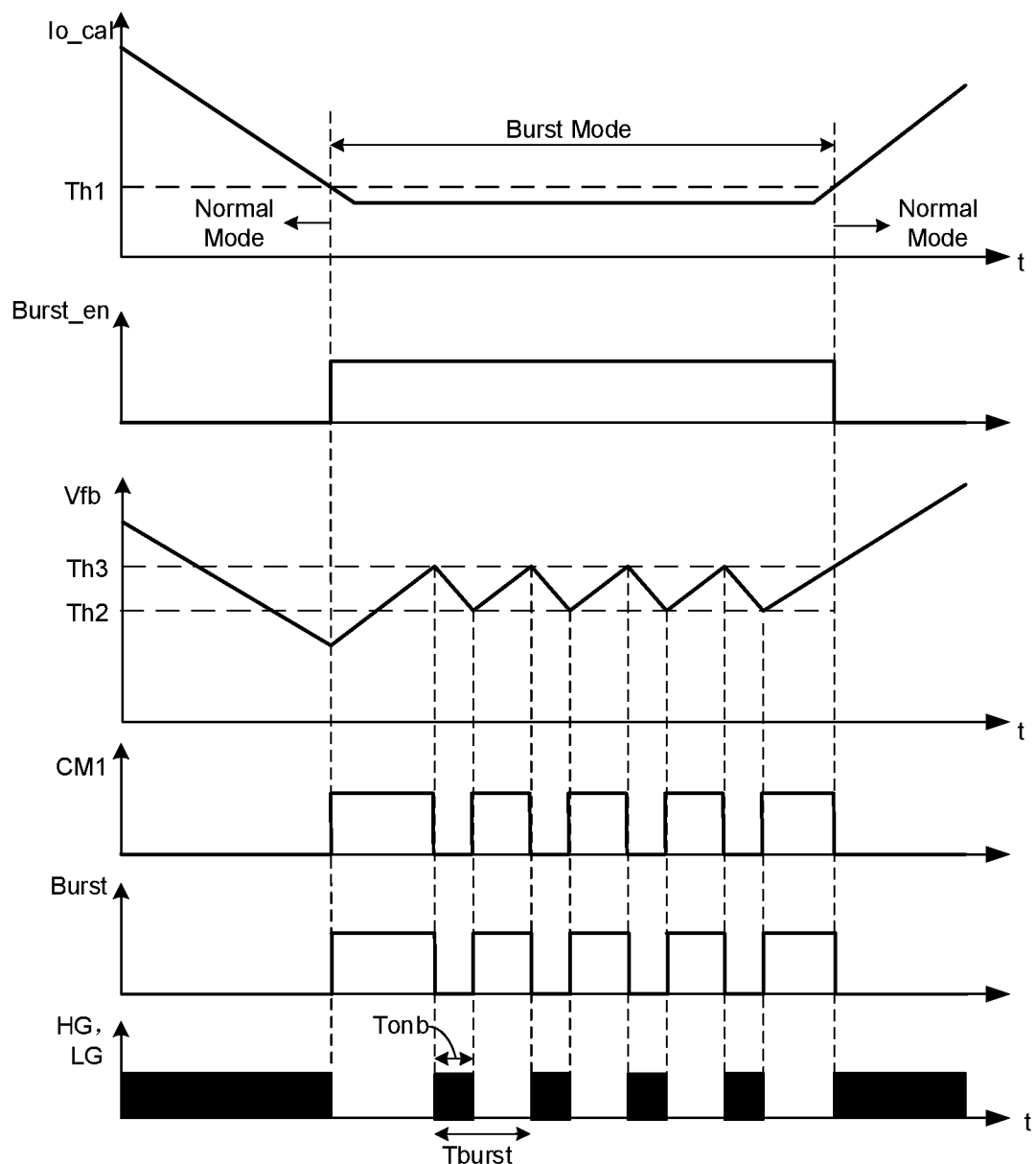
FIG. 7 schematically illustrates different modes the resonant converter 100 works based on an output current calculating value.

FIG. 7 schematically illustrates different modes the resonant converter 100 works based on the output current calculating value. Waveforms shown in FIG. 7 from top to bottom are the output current calculating value lo_cal, the burst mode control signal Burst_en, the output feedback signal Vfb, the comparing signal CM1, the mode indication signal Burst, the high side control signal HG, and the low side control signal LG. As shown in FIG. 7, when the output current calculating value lo_cal is less than the burst mode threshold value Th1, the burst mode control signal Burst_en changes to be high level, the resonant converter 100 changes from the normal mode to the burst mode, and when the output current calculating value Io_cal is greater than the burst mode threshold value Th1, the burst mode control signal Burst_en changes to be low level, the resonant converter 100 changes from the burst mode to the normal mode. During the burst mode, when the output feedback signal Vfb is less than the burst mode threshold value Th1, the comparing signal CM1 changes to be high level, the mode indication signal Burst changes to be high level, and the mode control circuit 154 shown in FIG. 3 controls both the high side control signal HG and the low side control signal LG to be low level, therefore both the high side transistor HG and the low side transistor LG keep off, and when the output feedback signal Vfb is greater than the threshold value Th3, the comparing signal CM1 changes to be low level, the mode indication signal Burst changes to be low level, the mode control circuit 154 shown in FIG. 3 controls the high side control signal HG and the low side control signal LG to be complementary high frequency pulses based on the high side control signal HG1 and the low side control signal LG1, and the high side transistor HS and the low side transistor LS are turned on alternately. During the normal mode, the mode indication signal Burst keeps in low level, the mode control circuit 154 shown in FIG. 3 controls the high side control signal HG and the low side control signal LG based on the high side control signal HG1 and the low side control signal LG1. Wherein during the burst mode, i.e. the burst period Tburst is equal to a sum of an alternate on-time Tonb when the high side transistor HG and the low side transistor LG are turned on alternately and an off time both the high side transistor HS and the low side transistor LS keep off. Wherein the threshold value Th3 is greater than the threshold value Th2. At the normal mode and during the alternate on-time Tonb, the high side control signal HG and the low side control signal LG are configured to control the high side transistor HS and the low side transistor LS to be turned on alternately.

Figure 8:
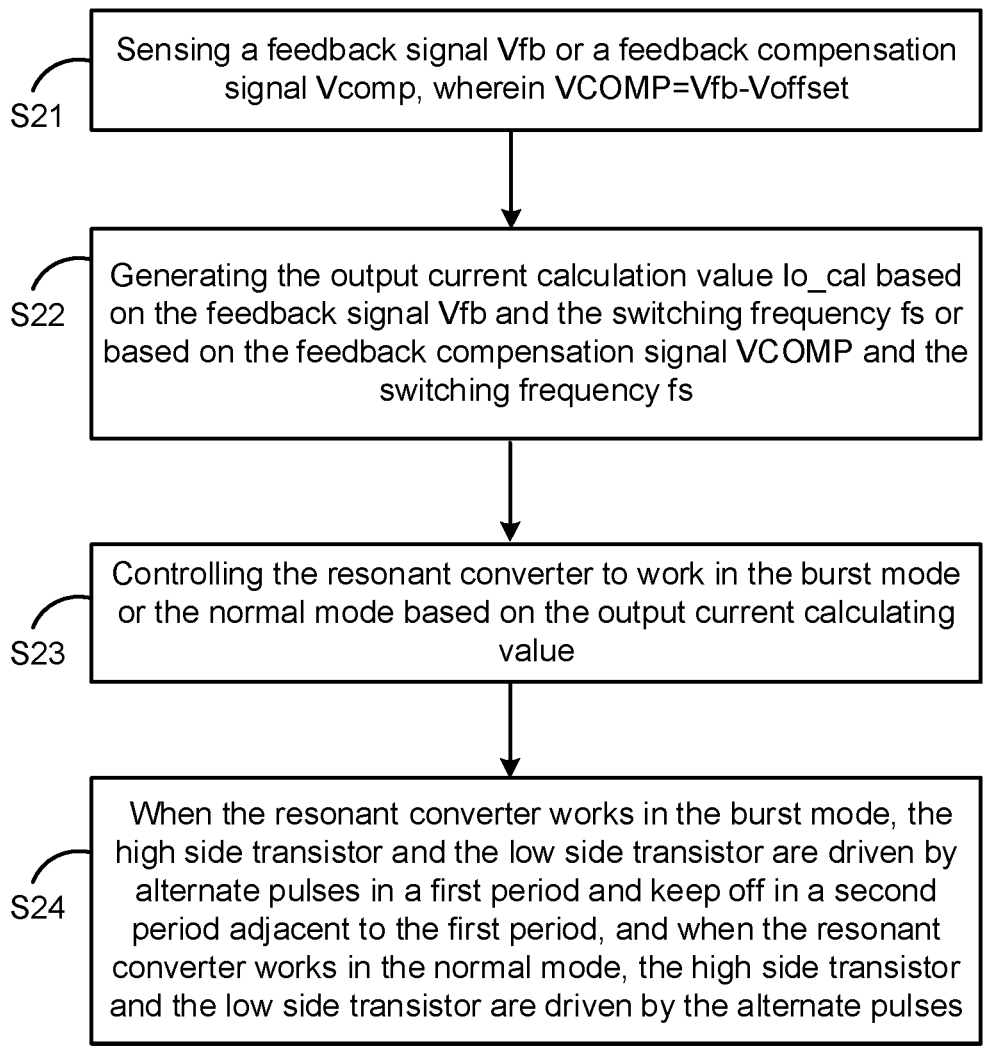
FIG. 8 is a flow chart of a control method used in a resonant converter in accordance with an embodiment of the present invention.

FIG. 8 is a flow chart of a control method used in a resonant converter in accordance with an embodiment of the present invention. It comprises steps S21-S24. The resonant converter receives the input voltage Vin and provides the output voltage Vout. The resonant converter includes a switching circuit and a resonant circuit, wherein the switching circuit has a high side transistor coupled between an input voltage and a switch node and a low side transistor coupled between the switch node and a reference ground. The resonant circuit is coupled to the switch node, and has a resonant capacitor Cr and the resonant inductor Ls.

At step S21, sensing the output feedback signal Vfb indicative of the output voltage Vo or sensing a feedback compensation signal VCOMP, wherein the feedback compensation signal is equal to the difference Vfb−Voffset between the output feedback signal Vfb and the bias voltage Voffset. In an embodiment of the present invention, the sensed output feedback signal Vfb or the feedback compensation signal VCOMP includes the voltage across the resonant capacitor Cr sensed at the off moment of the high side transistor HS.

At step S22, generating an output current calculating value Io_cal based on the output feedback signal Vfb and the switching frequency fs or based on the feedback compensation signal VCOMP and the switching frequency fs.

At step S23, controlling the resonant converter to work in the burst mode or the normal mode based on the output current calculating value Io_cal.

At step S24, when the resonant converter works in the burst mode, both the high side transistor and the low side transistor are driven by alternate pulses in a first period, and the high side transistor and the low side transistor keep off during a second period adjacent to the first period, and when the resonant converter works in the normal mode, both the high side transistor and the low side transistor are driven by the alternate pulses. Wherein a sum of the first period and the second period is equal to the burst period Tburst.

In an embodiment of the present invention, the output current calculating value Io_cal is proportional to the switching frequency fs of the switching circuit. In another embodiment, the output current calculating value Io_cal is further proportional to the input voltage Vin.

In an embodiment of the present invention, the control method further comprises generating a voltage sensing signal by sensing the voltage across the capacitor Cr, and generating the output current calculating value Io_cal based on a product of the voltage sensing signal at the off moment of the high side transistor and the switching frequency fs.

In an embodiment of the present invention, when the resonant converter works in the burst mode, the control method further comprises: calculating an average value of the output current calculating value in one or more burst periods, and judging whether to change the resonant converter to the normal mode or not based on the average value and the burst mode threshold value.

In an embodiment of the present invention, when the resonant converter works in the normal mode, the control method further comprises: when the output current calculating value is less than the burst mode threshold value, calculating an average of the output current calculating value in a predetermined time, judging whether to change the resonant converter to the Burst mode or not by comparing the average value with the burst mode threshold value.

Figure 9:
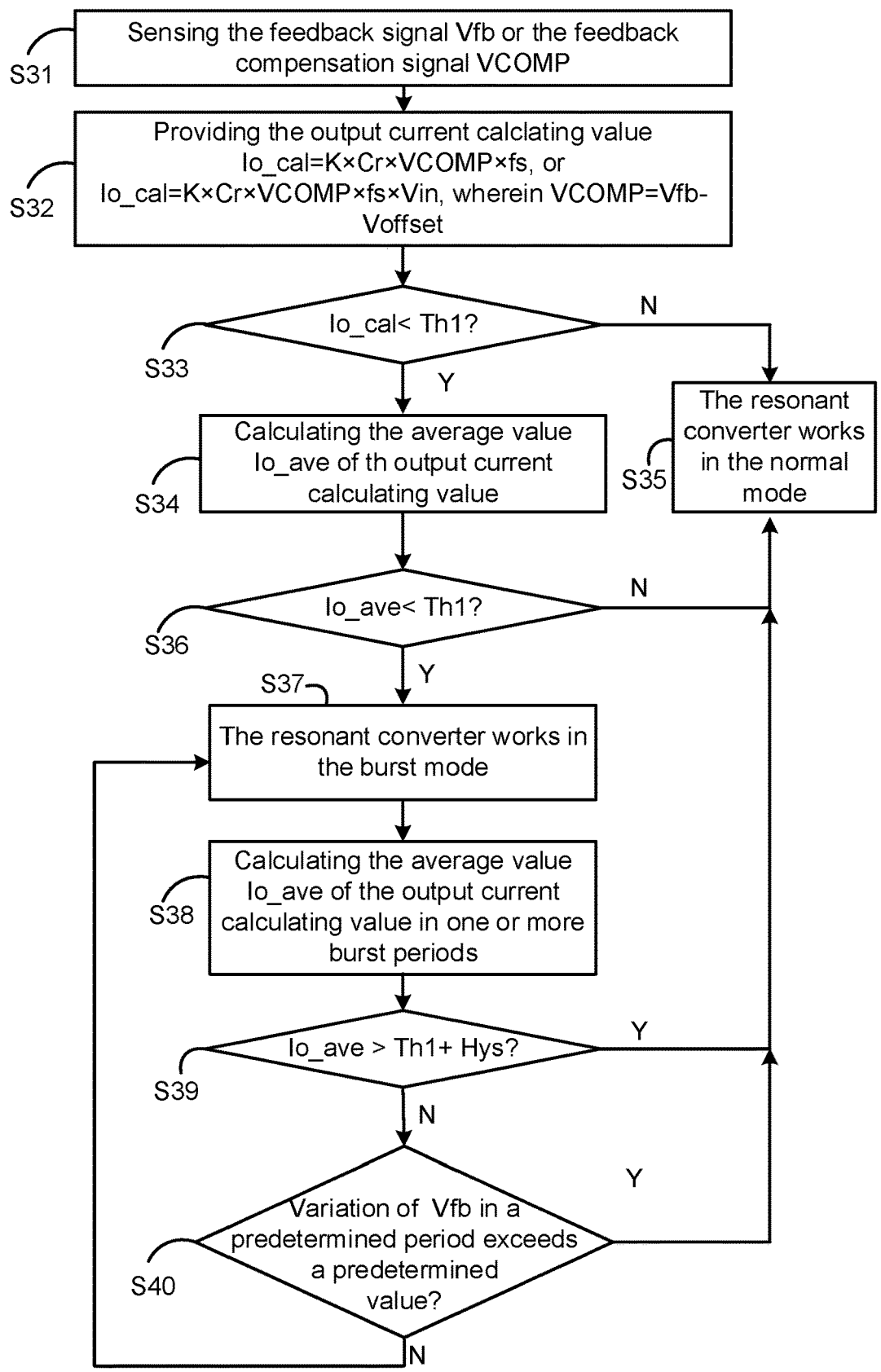
FIG. 9 is a flow chart of a control method used in a resonant converter in accordance with another embodiment of the present invention.

FIG. 9 is a flow chart of a control method used in a resonant converter in accordance with another embodiment of the present invention. It comprises steps S31-S40.

At step S31, sensing the output feedback signal Vfb or the feedback compensation signal VCOMP.

At step S32, providing the output current calculating value according to the equation Io_cal=K×Cr×VCOMP×fs or the equation Io_cal=K×Cr×VCOMP×fs×Vin, wherein the feedback compensation signal is provided according to the equation VCOMP=Vfb−Voffset.

At step S33, judging whether the output current calculating value Io_cal is less than the burst mode threshold value Th1 or not. If the output current calculating value Io_cal is less than the burst mode threshold value Th1, enters into the step S34, or else enters into the step S35, the resonant converter works in the normal mode.

At step S34, calculating an average value Io_ave of the output current calculating value.

At step S36, judging whether the average Io_ave is less than the burst threshold value Th1 or not. If the average value Io_ave is less than the burst mode threshold value, enters into the step S37, the resonant converter works in the burst mode, or else enters into the step S35, the resonant converter works in the normal mode.

At step S38, calculating the average value Io_ave of the output current calculating value in one or more burst periods.

At step S39, judging whether the average value Io_ave is greater than a sum Th1+Hys of the burst mode threshold value Th1 and a hysteresis value Hys or not. If Io_ave>Th1+

Hys, exit out of burst mode and enters into the step S35, the resonant works in the normal mode. Or else enters into the step S40.

At step S40, judging whether the output feedback signal increases suddenly or not, e.g. if a variation of the output feedback signal Vfb in a third predetermined time exceeds a predetermined value, it is judged that the output feedback signal Vfb increases suddenly, it is determined to exit out of the burst mode and enter into the step S35, the resonant converter changes to the normal mode. Or else enters into the step S34, the resonant converter continues working in the burst mode.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller used in a resonant converter with a switching circuit and a resonant circuit, wherein the switching circuit has a high side transistor coupled between an input voltage and a switch node and a low side transistor coupled between the switch node and a reference ground, the resonant circuit is coupled to the switch node and has a resonant capacitor and a resonant inductor, the controller comprises:
    a calculating module, configured to generate an output current calculating value based on a voltage across the resonant capacitor at an off moment of the high side transistor and a correction signal;
    a comparing module, configured to compare the output current calculating value with a burst mode threshold value, and configured to generate a burst mode control signal based on a comparing result of the output current calculating value and the burst mode threshold value; and
    a switching control module, configured to receive the burst mode control signal and control the resonant converter to work in a burst mode or a normal mode based on the burst mode control signal; wherein
    when the resonant converter works in the burst mode, the switching control module is configured to control the high side transistor and the low side transistor to be driven by alternate pulses in a first period, and configured to control the high side transistor and the low side transistor keeping off in a second period adjacent to the first period; and
    when the resonant converter works in the normal mode, the switching control mode is configured to control the high side transistor and the low side transistor to be driven by the alternate pulses.

2. The controller of claim 1, wherein the correction signal is proportional to the input voltage.

3. The controller of claim 1, wherein the calculating module is configured to generate the output current calculating value based on a product of the voltage across the resonant capacitor at the off moment of the high side transistor and the correction signal.

4. The controller of claim 1, wherein the calculating module comprises:
    a multiplication unit, configured to receive the correction signal and a voltage sensing signal indicative of the voltage across the resonant capacitor at the off moment of the high side transistor.

5. The controller of claim 1, wherein the comparing module comprises:
    a filter unit, configured to receive the output current calculating value and generate an average value of the output current calculating value by filtering the output current calculating value; and
    a comparing unit, configured to receive the output current calculating value and the average value of the output current calculating value, and configured to generate the burst mode control signal based on the output current calculating value, the average value of the output current calculating value and the burst mode threshold value.

6. The controller of claim 5, wherein when the resonant converter works in the normal mode, if the output current calculating value is less than the burst mode threshold value, the comparing unit is configured to judge whether to change the resonant converter to the burst mode based on the burst mode threshold value and the average value of the output current calculating value.

7. The controller of claim 5, wherein when the resonant converter works in the burst mode, the comparing unit is configured to judge whether to change the resonant converter to the normal mode based on the burst mode threshold value and the average value of the output current calculating value in one or more burst periods, wherein a burst period is equal to a sum of the first period and the second period.

8. The controller of claim 5, wherein when the resonant converter works in the burst mode, if the average value of the output current calculating value is greater than a sum of the burst mode threshold value and a hysteresis signal, the resonant converter is configured to change to the normal mode.

9. A resonant converter, comprising:
    a switching circuit having a high side transistor and a low side transistor, wherein the high side transistor is coupled between an input voltage and a switch node, and the low side transistor is coupled between the switch node and a reference ground;
    a resonant circuit coupled to the switch node, wherein the resonant circuit has a resonant capacitor and a resonant inductor;
    a voltage sensing circuit, configured to sense a voltage across the resonant capacitor and generate a voltage sensing signal;
    a calculating module, configured to generate an output current calculating value based on the voltage sensing signal at an off moment of the high side transistor and a correction signal;
    a comparing module, configured to compare the output current calculating value with a burst mode threshold value, and configured to generate a burst mode control signal based on a comparing result of the output current calculating value and the burst mode threshold value; and
    a switching control module, configured to receive the burst mode control signal and control the resonant converter to work in a burst mode or a normal mode based on the burst mode control signal; wherein when the resonant converter works in the burst mode, the switching control module is configured to control the high side transistor and the low side transistor to be driven by alternate pulses in a first period, and configured to control both the high side transistor and the low side transistor keeping off in a second period adjacent to the first period; and when the resonant converter works in the normal mode, the switching control mode is configured to control the high side transistor and the low side transistor to be driven by the alternate pulses.

10. The resonant converter of claim 9, wherein the voltage sensing circuit comprises:
a first capacitor, having a first terminal and a second terminal, wherein the first terminal is coupled to the resonant capacitor, and the second terminal is configured to provide the voltage sensing signal; and
a second capacitor, coupled between the second terminal of the first capacitor and the reference ground.

11. The resonant converter of claim 9, further comprising:
a transformer, having a primary winding and a secondary winding, wherein the primary winding is coupled to the resonant circuit; and
a rectifying and filtering circuit, coupled between the secondary winding of the transformer and a load, and configured to provide an output voltage to the load by rectifying and filtering a voltage across the secondary winding of the transformer.

12. A control method used in a resonant converter with a switching circuit and a resonant circuit, wherein the switching circuit has a high side transistor coupled between an input voltage and a switch node and a low side transistor coupled between the switch node and a reference ground, the resonant circuit is coupled to the switch node and has a resonant capacitor and a resonant inductor, the control method comprises:
sensing an output feedback signal indicative of an output voltage of the resonant converter or sensing a feedback compensation signal, wherein the feedback compensation signal is equal to a difference between the output feedback signal and a bias voltage;
generating an output current calculating value based on the output feedback signal or the feedback compensation signal; and
controlling the resonant converter to work in a normal mode or a burst mode based on the output current calculating value; wherein when the resonant converter works in the burst mode, the high side transistor and the low side transistor are configured to be driven by alternate pulses in a first period, and the high side transistor and the low side transistor are configured to keep off in a second period adjacent to the first period; and when the resonant converter works in the normal mode, the high side transistor and the low side transistor are configured to be driven by the alternate pulses.

13. The control method of claim 12, wherein the output current calculating value is proportional to a switching frequency of the switching circuit.

14. The control method of claim 12, wherein the output current calculating value is proportional to the input voltage.

15. The control method of claim 12, further comprising:
generating a voltage sensing signal by sensing a voltage across the resonant capacitor; and
generating the output current calculating value based on a product of the voltage sensing signal at an off moment of the high side transistor and a switching frequency of the switching circuit.

16. The control method of claim 12, wherein when the resonant converter works in the burst mode, the control method further comprising:
calculating an average value of the output current calculating value in one or more burst periods; and
judging whether to change the resonant converter to the normal mode based on the average value of the output current calculating value and a burst mode threshold value.

17. The control method of claim 12, wherein when the resonant converter works in the normal mode, the control method further comprising:
when the output current calculating value is less than a burst mode threshold value, calculating an average value of the output current calculating value in a predetermined period; and
judging whether to change the resonant converter to the burst mode by comparing the average value of the output current calculating value with the burst mode threshold value.

18. The control method of claim 12, wherein when the resonant converter works in the burst mode, the control method further comprising: when the output feedback signal during a predetermined time exceeds a predetermined value, the resonant converter is configured to change to the normal mode.

* * * * *